Feb. 26, 1924.  
W. A. BLAKE  
GAMBREL  
Filed May 22, 1922  
1,485,161
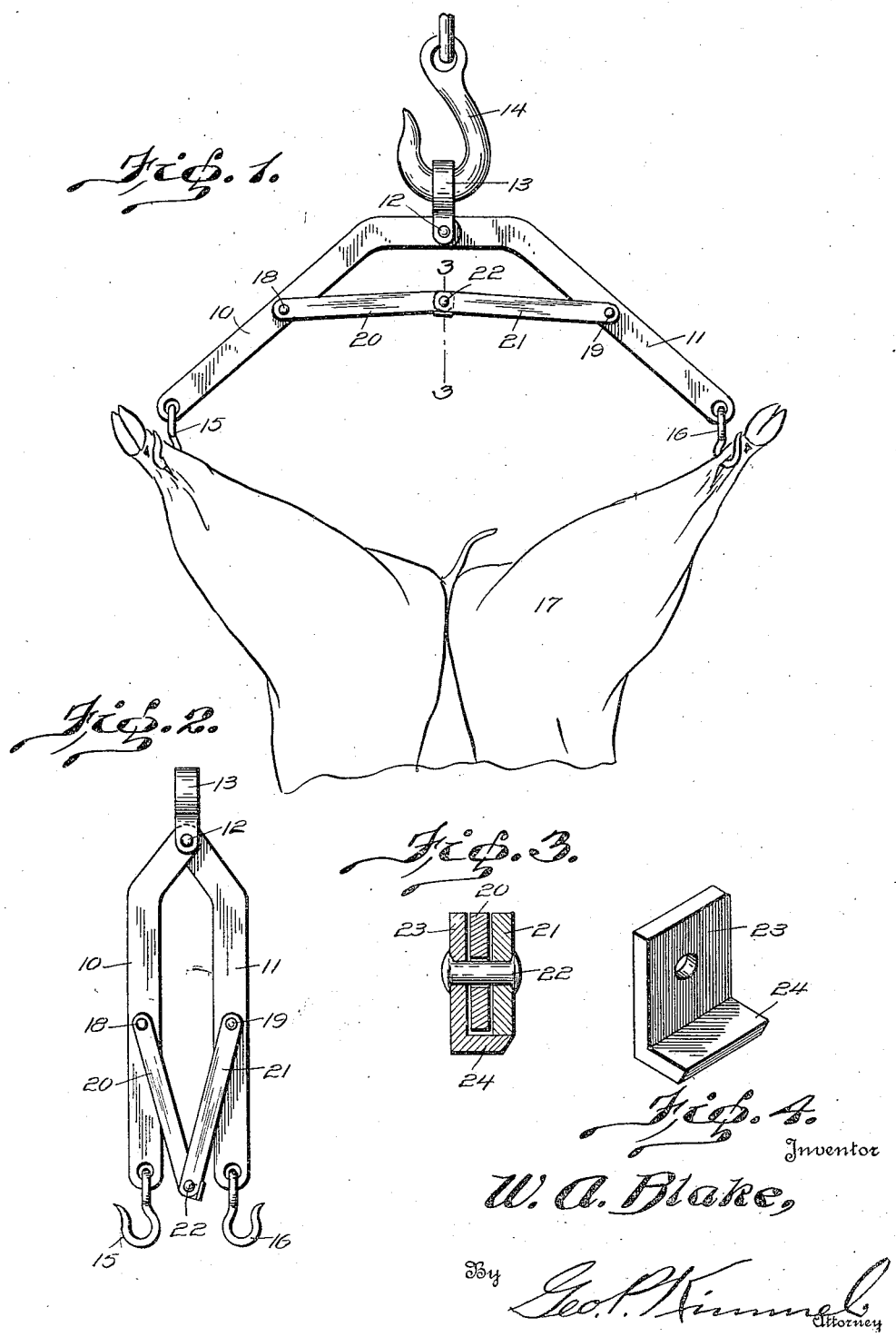

Patented Feb. 26, 1924.

1,485,161

UNITED STATES PATENT OFFICE.

WILLIAM A. BLAKE, OF ALEXANDRIA, INDIANA.

GAMBREL.

Application filed May 22, 1922. Serial No. 562,707.

*To all whom it may concern:*

Be it known that I, WILLIAM A. BLAKE, a citizen of the United States, residing at Alexandria, in the county of Madison and State of Indiana, have invented certain new and useful Improvements in Gambrels, of which the following is a specification.

This invention relates to gambrel devices for suspending meat carcasses, and has for one of its objects to improve the construction and increase the efficiency and utility of devices of this character.

Another object of the invention is to provide a device of this character having means whereby the device will be held from collapsing in event of the strain of the load of the carcass being removed from one side only.

Another object of the invention is to provide a device of this character constructed in duplicate and interchangeable parts, whereby the expense of manufacture is materially decreased and restoration of broken or impaired parts simplified.

With these and other objects in view the invention consists in certain novel features of construction as hereinafter shown and described and then specifically pointed out in the claims, and in the drawings illustrative of the preferred embodiment of the invention:—

Figure 1 is a side elevation of the improved device applied.

Fig. 2 is a view of the improved device folded or collapsed.

Fig. 3 is a transverse section enlarged, on the line 3—3 of Fig. 1.

Fig. 4 is an enlarged detached perspective view of one of the locking clip devices.

The improved device comprises coacting bars 10 and 11 pivotally united at one end at 12, preferably by a clevis like device 13 adapted to receive a suspension hook 14 or the like.

At their outer ends the bars 10 and 11 are provided respectively with means such as hooks 15 and 16 for engaging the "hock" portions of a meat carcass represented conventionally at 17.

Pivoted at 18 and 19 to the bars 10 and 11 intermediate the ends are link devices 20 and 21, the latter pivotally united by a pin 22 at their confronting ends.

The links 20 and 21 are precisely alike and with rounded apertured ends and are thus interchangeable from side to side and from end to end, as will be obvious.

Engaging the pivot pin 22 is a clip device 23 having a lateral stop rib or outturn 24 extending therefrom and beneath adjacent parts of the links as shown. The clip with its outturn or rib 24 thus operates to limit the movement of the links 20 and 21 in one direction, and prevent the bars 10 and 11 from "spreading" beyond a certain predetermined distance, as shown in Fig. 1, while at the same time permitting the device to be folded as in Fig. 2 for transportation or storage.

The links 20 and 21 being precisely alike can be manufactured in quantities at small expense and are therefore interchangeable and reversible end for end, while the clip device 23—24 can be "struck up" from a small section of plate metal and without any machining for either the clips or links other than punching the apertures therein and rounding the ends of the links, and this can be accomplished at the same time that the clips and links are manufactured, and require no extra machinery to accomplish the desired results.

The improved device is simple in construction, can be formed of any required size and of any suitable material, but will preferably be of metal as light as possible consistent with the strains to which it will be subjected.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed as new is:—

1. A device of the class described including coacting bars overlapping at one end and the overlapping portions pivotally united, a clip device bearing against one of the overlapping portions and united thereto by the same pivot by which the link members are united and outturned to bear against the adjacent edges of the overlapping portions of the links.

2. A device of the class described comprising coacting bars pivotally united at one end and with suspension means at their other ends, coacting links pivoted at their outer ends to said bars intermediate the ends thereof, the confronting ends of said links overlapping and the overlapping portions pivotally united, a clip device bearing against one of the overlapping portions and united thereto by the same pivot by which the link members are united and outturned to bear against the adjacent edges of the overlapping portions of the links.

In testimony whereof, I affix my signature hereto.

WILLIAM A. BLAKE.